United States Patent
Striker et al.

(10) Patent No.: US 6,316,936 B1
(45) Date of Patent: Nov. 13, 2001

(54) LINEAR POSITION SENSOR FOR A TRANSMISSION MANUAL VALVE

(75) Inventors: David Lee Striker, Plymouth; Diane M. Gietzen, Warren; Susan A. Butler, Waterford; Raymond Carl Siciak, Ann Arbor, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/469,600

(22) Filed: Dec. 21, 1999

(51) Int. Cl.[7] .............................. G01B 7/30; G01R 33/06
(52) U.S. Cl. .................. 324/207.21; 324/207.24; 74/DIG. 7; 74/473.1
(58) Field of Search ................... 324/207.21, 207.25, 324/207.13, 207.22, 207.24; 338/32 R; 74/DIG. 7, 473.1, 471, 335, 473.12

(56) References Cited

U.S. PATENT DOCUMENTS

| | | |
|---|---|---|
| 4,592,249 | 6/1986 | Lehmann et al. . |
| 4,652,821 | 3/1987 | Kreft . |
| 4,698,996 | 10/1987 | Kreft et al. . |
| 5,570,015 | 10/1996 | Takaishi et al. . |
| 5,589,769 | 12/1996 | Krahn . |
| 5,812,330 | 9/1998 | Akada . |
| 5,861,747 * | 1/1999 | Kubinski .................. 324/207.21 |
| 5,929,631 | 7/1999 | Striker et al. . |

* cited by examiner

*Primary Examiner*—Jay Patidar
(74) *Attorney, Agent, or Firm*—Larry I. Shelton (57) ABSTRACT

A position sensor assembly for detecting linear movement of a transmission manual valve is comprised of a set of permanent magnets mounted on a movable carrier and an array of GMR elements located between the juxtaposed magnet poles. The magnet set establishes a high and low magnetic flux field pattern across the GMR elements whose resistance values decrease as they are subjected to the moving magnetic field. The change in resistance is converted to a linear position output signal corresponding to the displacement of the transmission manual valve. The magnet set is moved transversely to the direction of movement of the manual valve. The magnet set is assembled on a magnet carrier that is mechanically linked to the transmission manual valve for which linear position signal is desired.

8 Claims, 7 Drawing Sheets

ANALOG SIGNAL

Fig. 13

PWM SIGNAL

LINEAR POSITION SENSOR FOR A TRANSMISSION MANUAL VALVE

TECHNICAL FIELD

The invention relates to a displacement measuring system for obtaining a linear displacement signal for a movable control element.

BACKGROUND ART

Multiple-ratio automatic transmissions for automotive vehicle drivelines have multiple-ratio gearing and fluid pressure-activated clutches and brakes that are engaged and released under the control of a hydraulic valve circuit. The circuit includes a manual valve that can be shifted linearly to each of several drive ranges for the multiple-ratio transmission. The clutches and brakes establish and disestablish each of several torque flow paths through the gearing. The circuit is supplied with fluid pressure developed by an engine-driven pump.

The control circuit includes a pressure regulator that regulates line pressure made available by the pump. Regulated line pressure is distributed to selected valve members to establish the various forward driving ratio ranges and a reverse driving ratio. The selection of the drive ranges and reverse is under the control of a manual valve. A driver-operated mechanical linkage is used to adjust the position of the manual valve.

In order to obtain an accurate indication of the actual position of the manual valve, a mechanical position sensor is located on the exterior of the transmission housing, which contains the control valve system and the multiple-ratio gearing.

The position sensor comprises a mechanical lever connected directly to the manual valve. The position of the mechanical lever is detected by a sliding electrical contact array, which forms a part of an electric sensor circuit that detects the various manual valve positions.

A position sensor of this kind has inherent disadvantages because it is susceptible to malfunction if the sliding contacts of the contact array become contaminated and establish an open circuit in the position sensor. The sensor also creates driveline packaging difficulties because of the space that must be dedicated to the sensor.

DISCLOSURE OF INVENTION

The invention comprises a position sensor for detecting the position of the manual valve in an automatic transmission for an automotive vehicle which does not rely upon sliding contacts of a contact array and which can be located within the transmission housing, thereby avoiding packaging difficulties associated with known manual valve position sensors for automatic transmissions. The sensor comprises a magnet system mounted adjacent to and driven by the manual valve within the transmission housing. A magnetic field created by the magnet system is configured so that it produces maximum intensity at desired reference points relative to manual valve position.

An array of giant magneto-resistive elements (GMR elements) is positioned adjacent to a moving manual valve to measure the field strength of the magnet system. The GMR elements all have the same base resistance, but the resistance values of the individual elements in the array change as the magnet system is moved relative to the array. The resistance of the GMR elements closest to the maximum field reference points has a lower resistance than those farther from the same reference points.

A commercial source for GMR elements is Nonvolatile Electronics, Inc.

The sensor of the invention uses digital and analog electronics to convert the change of GMR element resistance into usable position information for the manual valve. A scanning logic makes it possible to generate a voltage waveform based on the combined resistances of a set number of selected GMR elements. The scanning logic waveform will change as the manual valve shifts and the resistance of the GMR elements changes. One waveform cycle is produced by one scan through all of the GMR elements in a successive pattern.

The voltage across a load resistor is measured during each clock interval of an electronic shift register, which forms a part of the scanning logic. The scanning pattern continues indefinitely, thus causing a changing stepped voltage to be produced across the load resistor. The voltage across the load resistor will be highest when the GMR elements positioned in the strongest part of the magnetic field are selected. It is lowest when the elements in the weakest field are selected.

Analog filtering optimizes the voltage signal. The position information is contained in the analog voltage signal. The output signal obtained in this fashion is distributed to a processing unit and decoded to produce a pulse-width modulated output signal (PWM) with a duty cycle proportional to the displacement of the manual valve.

The magnet system is carried by a magnet carrier, which is mounted on a housing and adapted to slide relative to the housing in a direction transverse to the direction of movement of the manual valve. A slider post is positioned in a linear slot in the housing and extends into an angled slot guide track in the magnet carrier. The slider post is directly contacted by the manual valve. The guide track and the slider post translate linear movement of the manual valve into a transverse motion of the magnet carrier. In this way, the magnet carrier is adjusted relative to the GMR array. This configuration minimizes space, thereby optimizing packaging geometry.

BRIEF DESCRIPTION OF DRAWINGS

FIG. 7 is an isometric view showing the top of the sensor housing seen in FIGS. 5 and 5a;

BEST MODE FOR PRACTICING THE INVENTION

Figure 1:
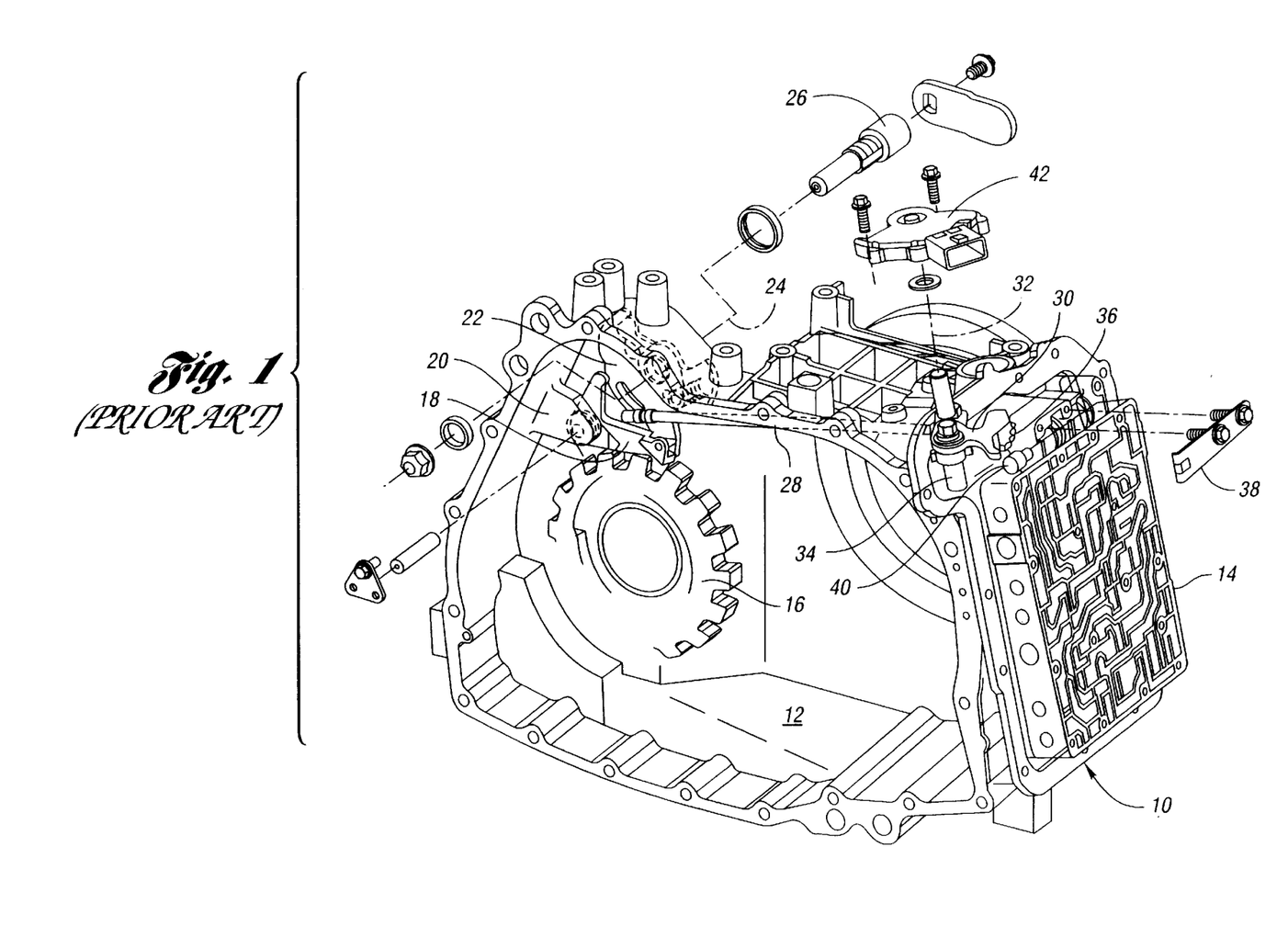
FIG. 1 is a schematic isometric view of the housing for an automatic transmission of known design, which includes a manual valve position sensor mounted on the exterior of the housing.

An automatic transmission of known design comprises a transmission housing seen at 10 in FIG. 1. This includes a main transmission gear housing 12 and a valve body casting 14. The transmission has a parking gear 16 fixed to the torque output shaft. The gear has external teeth that engage a parking pawl 18, which pivots on a parking pawl mounting pin carried by an internal boss 20 in the transmission housing 12. A parking pawl actuating cam 22, when it is rotated about its axis 24, moves the pawl into and out of engagement with the parking gear external teeth. The parking pawl actuating cam is moved by a manual lever control shaft 26, which is under the control of the vehicle operator.

As the parking pawl actuator cam is adjusted, a manual valve detent lever actuating rod 28 is adjusted linearly. The left end of the rod 28 is connected to the parking pawl actuating cam 22. The right end of the rod 28 is connected to a manual valve detent lever 30, which pivots about axis 32 on a rotatable shaft 34. The manual valve detent lever 30 has detent recesses 36, which are engaged by a manual valve detent spring 38. The manual valve detent lever 36 sometimes is referred to as a rooster comb, which has the recesses 36 engageable with an end of the detent spring 38, thereby establishing precise angular positions of the manual valve detent lever for each drive range position for the driver-operated manual lever control shaft 26.

The manual valve detent lever carries a valve actuator rod that engages a slidable manual valve 40, which forms a part of the control valve assembly located in the valve body 14.

The shaft 34, which moves with the manual valve detent lever, acts as a motion input shaft for a manual lever position sensor 42 mounted on the exterior of the transmission housing 10.

Figure 2:
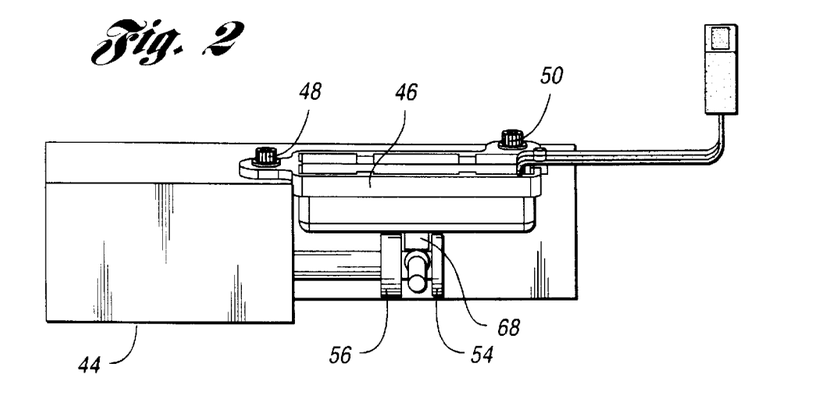
FIG. 2 is a partial assembly view showing one side of the position sensor assembly of the invention together with one end of the manual valve for an automatic transmission.
Figure 3:
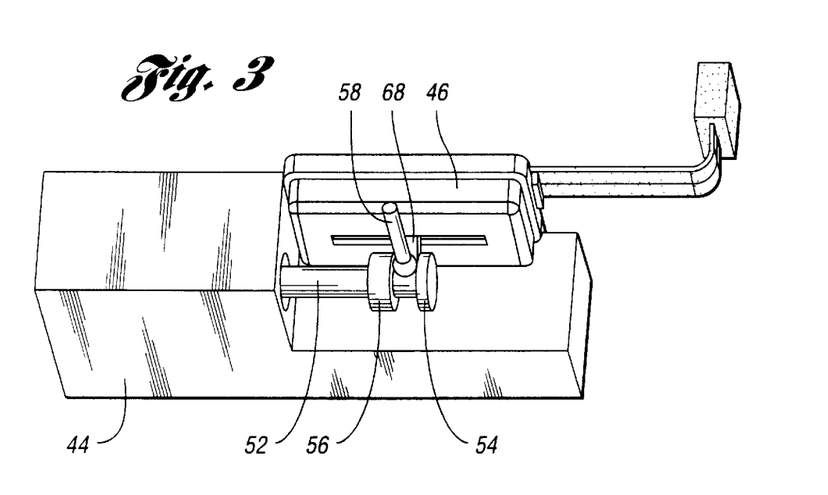
FIG. 3 is a view of the structure of FIG. 2 as seen from the lower side of the position sensor assembly.
Figure 4:
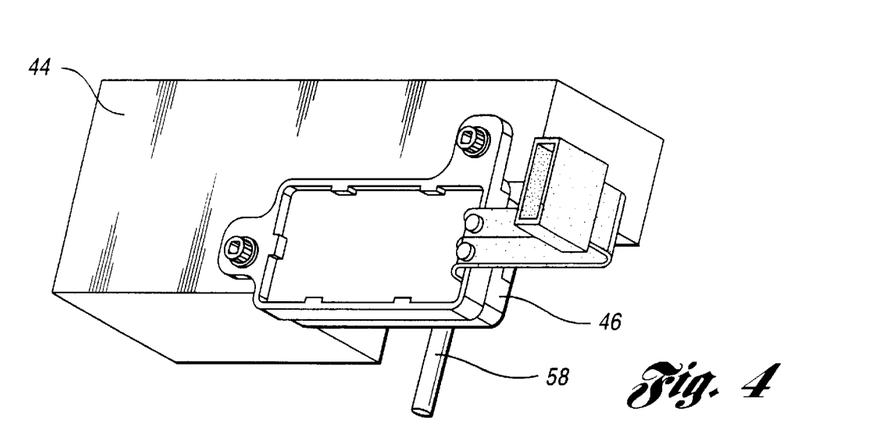
FIG. 4 is a side view of the sensor assembly of FIG. 2.

FIGS. 2–4 show the improved manual valve position sensor of the invention, which is located within the transmission housing 10 rather at a location on the exterior of the housing as in the prior art construction of FIG. 1. FIG. 2 shows a transmission boss 44, which forms a part of the transmission cast housing. The sensor housing of the invention, as seen at 46, is secured by bolts 48 and 50 to the transmission housing boss 44. The boss 44, best seen in FIG. 3, forms a part of the control valve body in which manual valve 52 is mounted. The end of the manual valve has an annular groove defined by adjacent annular shoulders 54 and 56. A shift lever pin 58 has its end received in the annular groove between the shoulders 54 and 56 so that when the pin 58 is moved in the direction of the axis of the manual valve 52, the manual valve will be shifted from one drive range position to the other. The shift lever pin 58 is carried on a manual valve detent lever of the type shown, for example, at 30 in FIG. 1.

Figure 5:
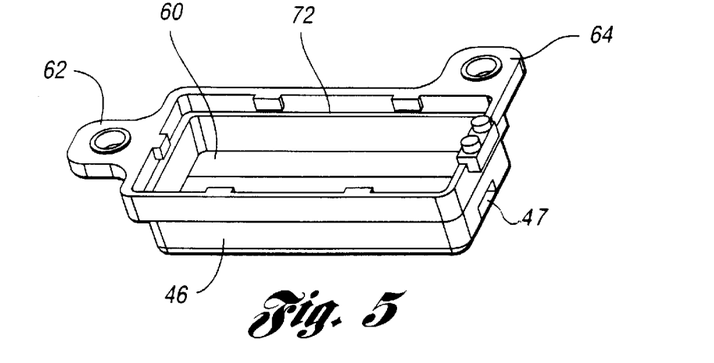
FIG. 5 is an isometric view of the sensor housing seen in FIG. 1.
Figure 5A:
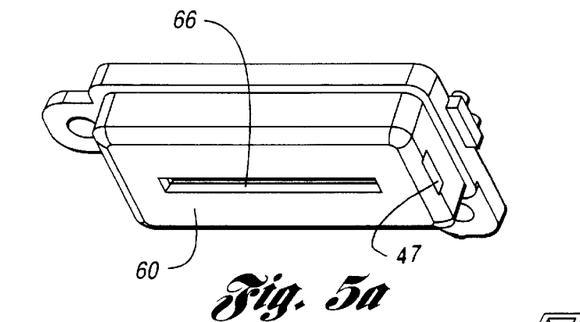
FIG. 5a is an isometric view showing the underside of the housing seen in FIG. 5.
Figure 7:
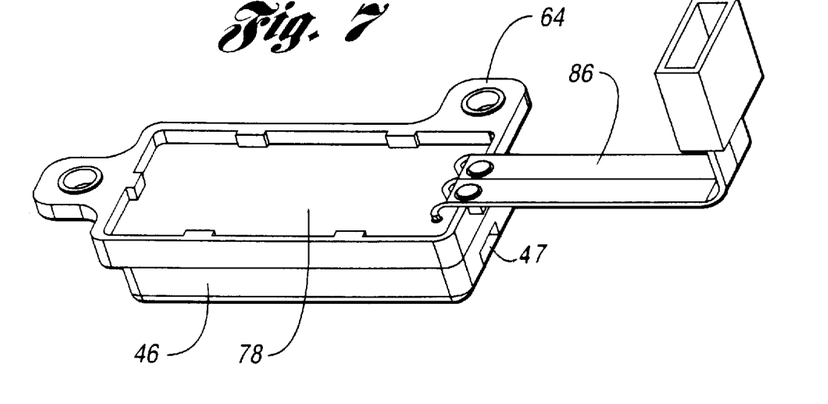
Figure 9:
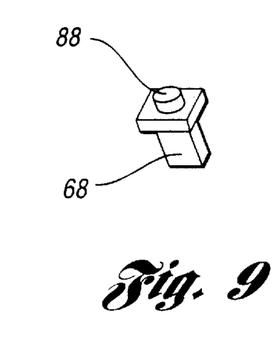
FIG. 9 is an isometric view of a slider post that registers with the movable magnet carrier and the movable manual valve.
Figure 9A:
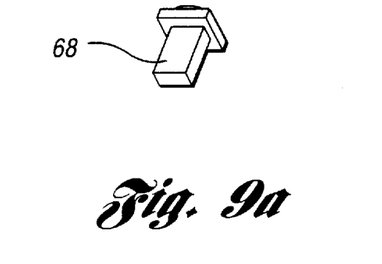
FIG. 9a is an isometric view showing the underside of the slider post of FIG. 9.

The position sensor housing 46 has a bottom side 60, as seen in FIGS. 5 and 5a. It also has mounting bosses 62 and 64, which receive the mounting bolts 48 and 50, respectively. The bottom side 60 has a linear slot 66, which receives the end 68 of a slider post, as seen in FIGS. 9 and 9a. The end 68 extends through the slot 66. As seen in FIGS. 2 and 3, the end 68 is received in the annular groove between the shoulders 54 and 56 of the manual valve. Thus, when the manual valve is shifted linearly, the guide post end 68 will move linearly within the slot 66. An opening 47, as seen in FIGS. 5, 5a and 7, is provided at each end of the housing so that slider post movement will expel any contained debris through the opening and out of the sensor assembly.

Figure 8:
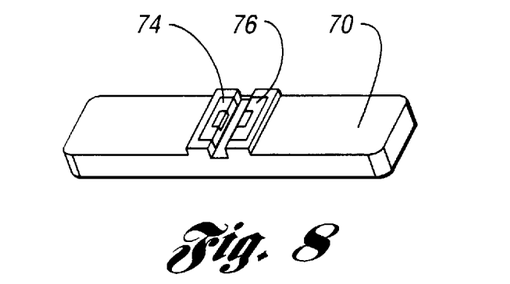
FIG. 8 is an isometric top view of the magnet carrier that is positioned within the housing of FIG. 5.
Figure 8A:
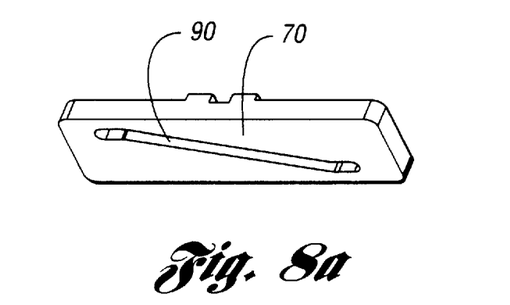
FIG. 8a is a bottom isometric view of the carrier seen in FIG. 8.

A magnet carrier plate 70, seen in FIGS. 8 and 8a, is positioned within the sensor housing 46. It engages a shoulder 72 surrounding the interior of the housing 46. The magnet carrier 70 has a width that is less than the width of the interior of the housing 46. Thus, it is capable of sliding on the shoulder 72 in a direction perpendicular to the direction of the slot 66.

Mounted on the top side of the magnet carrier 70 is a pair of magnets 74 and 76. They are located with their poles spaced, one with respect to the other, in a direction transverse to the principal axis of the magnet carrier 70. Each magnet has pole faces that are in juxtaposed spaced relationship with respect to the pole faces of the adjacent magnet.

A printed circuit board 78 is adapted to be assembled on the housing 46, thereby enclosing the magnet carrier in the interior of the housing.

Figure 6:
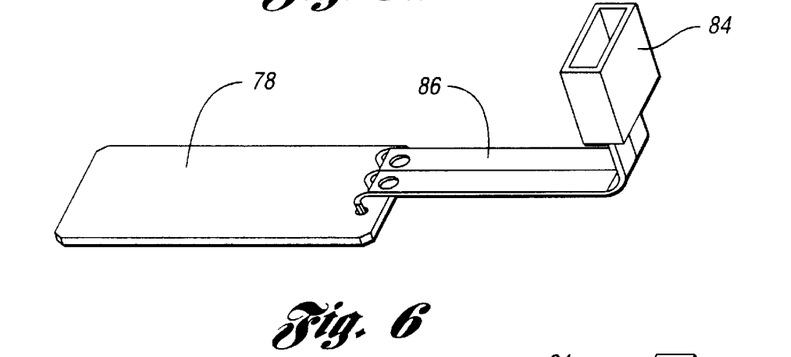
FIG. 6 is a plate that mounts a printed circuit board assembly for the sensor of the invention.
Figure 6A:
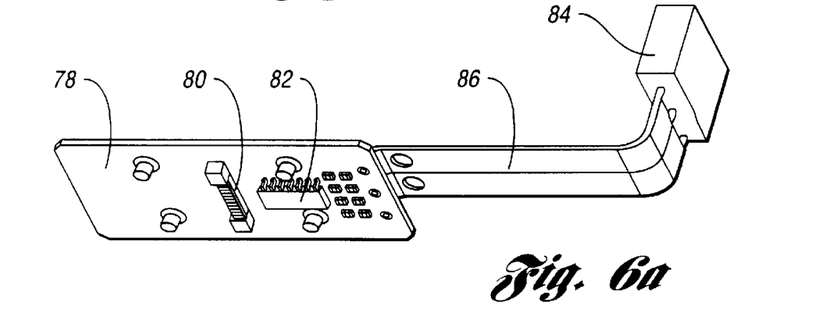
FIG. 6a is a view showing the underside (component side) of the printed circuit board assembly of FIG. 6.

The board 78 has secured to its undersurface, as seen in FIG. 6a, an array of giant magneto-restrictive elements (GMR elements) as seen at 80. The elements 80 are positioned on the board 78 so that when the board 78 is assembled in place over the housing 46, the GMR element array 80 will be located within the space between the poles of the magnets 74 and 76.

The underside of the board 78 also carries an application-specific integrated circuit (ASIC), seen at 82. This will be described with reference to the schematic drawing of FIG. 15. The underside of the board 78 also supports filter elements, which are EMI caps that function as filters for eliminating extraneous EMI interference for the output of the sensor. The output of the sensor is transferred to an electrical connector 84 through a cable assembly 86, the end of which is secured to one end of the board 78. The connector 84 and cable assembly 86 also provide the electrical power and ground circuits to the sensor assembly.

The slider post, in addition to the end 68, has a rounded end 88, which is received in a transversely extending groove 90 in the underside of the magnet carrier 70, seen in FIG. 8a.

When the slider post moves in the slot 66, the slider post will move in the transversely extending guide track 90, thereby adjusting the magnet carrier in a direction transverse to the direction of movement of the manual valve. This will adjust the position of the GMR element array 80 relative to the magnets 74 and 76.

The sensor assembly will be exposed to automatic transmission fluid contaminated by small quantities of ferrous particles that can be attracted to the magnet carrier. Openings 47 are provided in the housing at each end of the slot 66 so that slider post movement will wipe accumulated particles from the magnet carrier surface and expel them through the openings.

FIG. 7 shows the magnetic carrier board 78 and the housing 46 in its assembled state. It is adapted to be secured within the transmission housing 10 where it is protected from the environment, unlike the manual lever position sensor 42 of the prior art design seen in FIG. 1.

Figure 10:
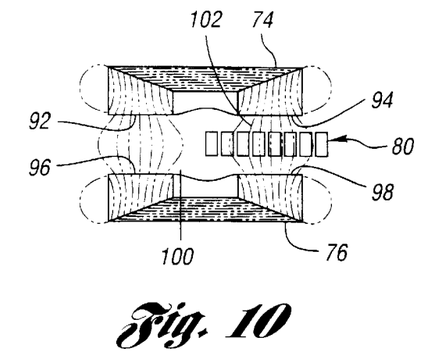
FIG. 10 is a schematic view of the magnets of the magnet assembly carried by the magnet carrier of FIG. 8.
Figure 11:
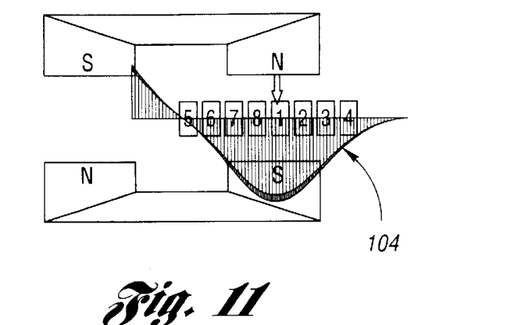
FIG. 11 is a diagram showing the field strength vectors when the magnets of FIG. 10 are in the full left position.
Figure 11A:
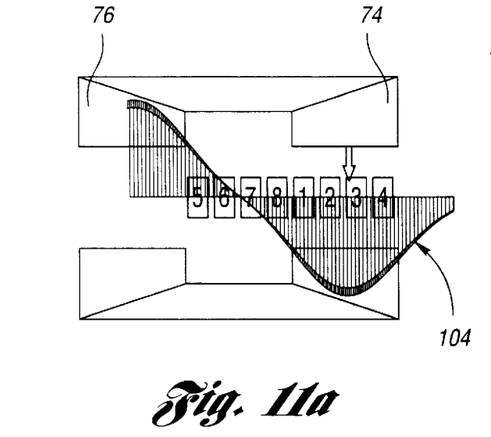
FIG. 11a is a diagram showing the field strength vectors when the magnets are in the 50% left position.
Figure 11B:
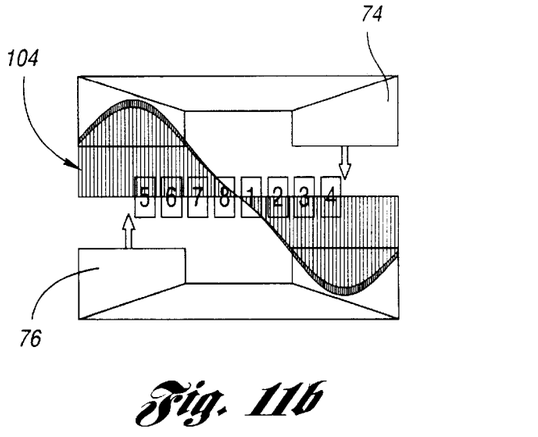
FIG. 11b is a diagram showing the field strength vectors when the magnets are in the center position.
Figure 11C:
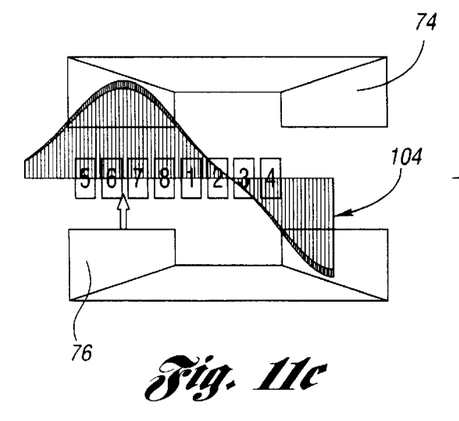
FIG. 11c is a diagram showing the field strength vectors when the magnets are in the 50% right position.
Figure 11D:
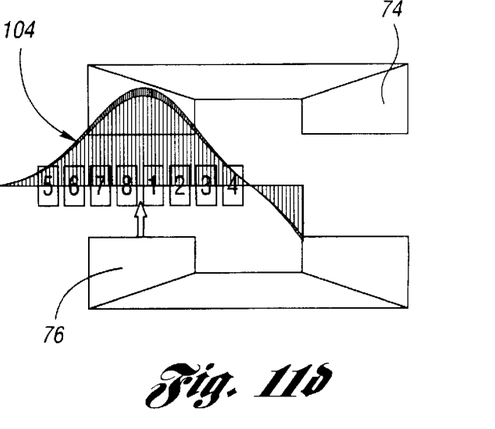
FIG. 11d is a diagram showing the field strength vectors when the magnets are in the full right position.

The magnets 74 and 76 are seen in schematic form in FIGS. 10–11d. The poles for the magnet 74 are seen at 92 and 94. The poles for the magnet 76 are seen at 96 and 98. The north and south poles of the magnet 74 are situated directly opposite the south and north poles of the magnet 76. This produces flux equipotential lines, as shown at 100 and 102.

As indicated in FIG. 10, the GMR element array comprises eight GMR elements arranged in a side-by-side linear arrangement. FIG. 11 is a schematic representation of the field strength vectors 104. When the magnets are in the full left position, the individual GMR elements are arranged in a pair of groups, each group having four GMR elements. These elements are identified by numerals 5, 6, 7, 8, 1, 2, 3 and 4.

When the magnets are positioned in the full left position shown in FIG. 10, the field strength vectors are as shown in FIG. 11. The field strength vectors shown in FIG. 11a correspond to the relative position of the magnets at the 50% left position.

When the magnets are in the center position, the field strength vectors are positioned as shown in FIG. 11b. When the magnets are in the 50% right position, the field strength vectors are shown in FIG. 11c. When the magnets are in the full right position, the field strength vectors are as shown in FIG. 11d. The arrows shown in FIGS. 10–11d indicate the points of maximum field intensity.

As the manual valve pushes the slider post from one position to another within the groove 66, the magnetic field for the magnets move from end to end along the GMR element array. The resistance values of the GMR elements change as the field moves. The elements that are exposed to the highest field intensity will exhibit the lowest resistances. The position of the manual valve thus can be recorded by storing the relative resistance values of the GMR elements.

The calibration of the magnetic field intensity is not particularly critical since the relative differences between the resistances is large enough to produce an accurate detection of the linear movement of the manual valve. The calibration changes of the magnets and the calibration changes of the electronics for magnet field due to temperature changes does not adversely affect the accuracy of the system.

Figure 12:
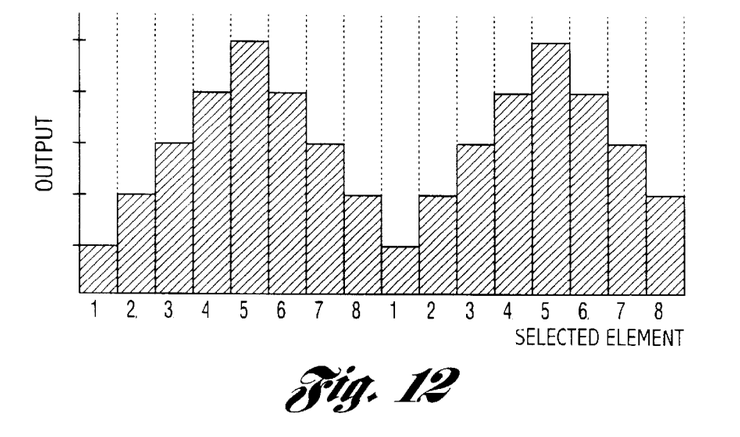
FIG. 12 is a diagram showing the digital scan signal for the array of GMR elements when the magnets are in the center of the range of travel.
Figure 15:
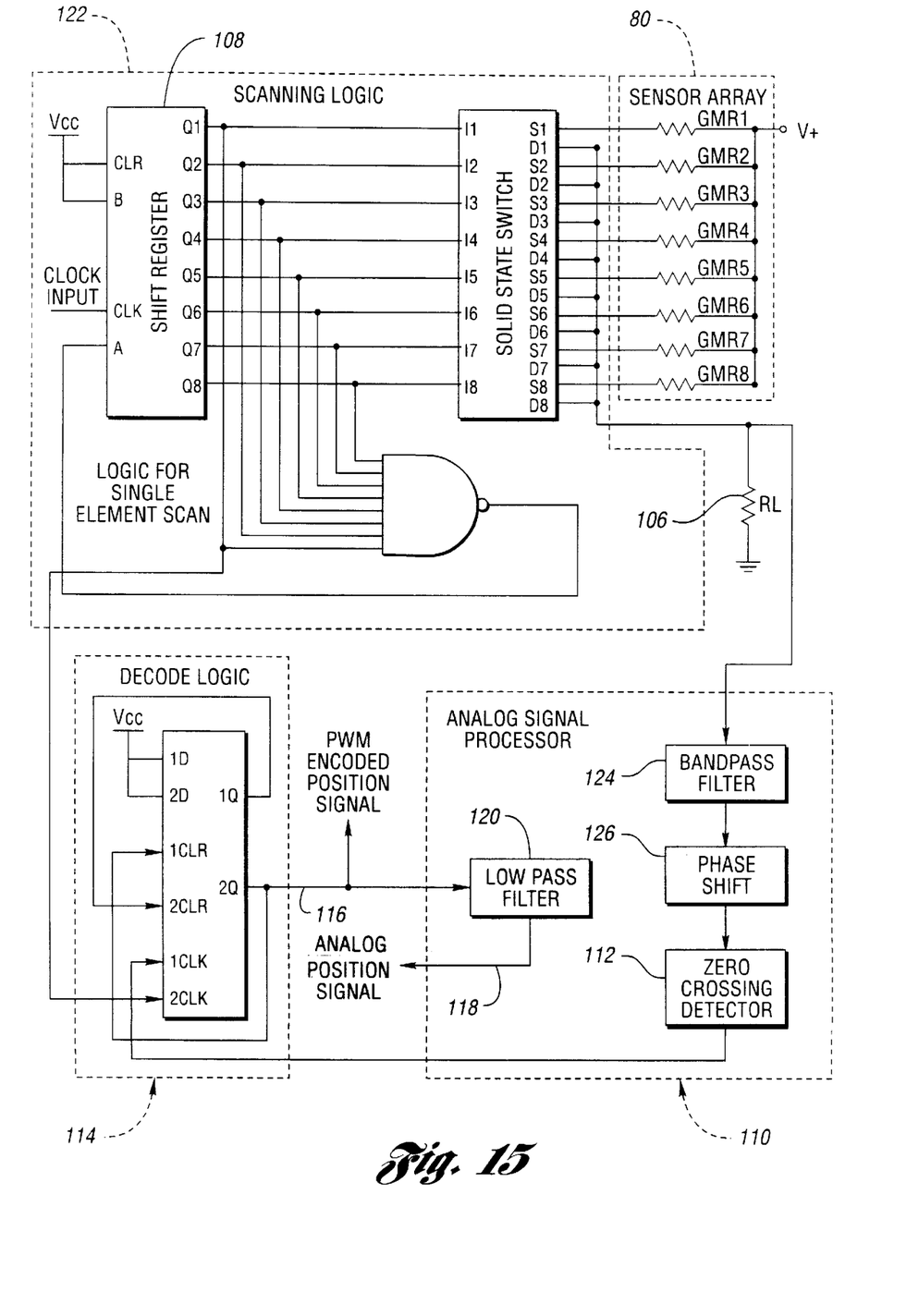
FIG. 15 is a schematic block diagram showing the electronic elements of the position sensor of the invention.

The GMR element array can be scanned using a shift register and electronic switches, which are indicated in FIG. 15. The resultant stepped output form of FIG. 10 can be filtered, phase shifted and passed through a zero crossing detector. A logic circuit, as seen in FIG. 15, compares the "time to reach peak voltage" (related to element resistance) to "total time for one scan of all the elements" can be used to produce a pulse-width modulated output signal, as seen in FIG. 12. The percent "on time" or "off time" of the PWM position signal equates to the percent of manual valve displacement from the starting location. For example, if the PWM signal has a 50% duty cycle, the manual valve will have moved half way through its full stroke. If it is desired, the PWM signal can be passed through a low-pass filter circuit to provide a DC analog output signal.

The GMR elements all have the same base resistance at zero magnetic field, but the resistance values for the individual elements in the array decrease as the magnetic field across them increases.

The digital and linear electronics of FIG. 15 convert the GMR element resistance values into usable position information. The scanning logic portion connects the output from one of the GMR elements seen in FIGS. 10–11d to a load resistor 106 in FIG. 15. The voltage generated is based on the resistances of the selected element and the load resistor. The scanning logic then shifts one position, thereby connecting element 2 to the load resistor 106. This process continues with the sequential selection of elements 3, 4, 5 and 6. One sequence of this pattern would be a single scan.

The positive leading edge at location Q1, seen at 108 in FIG. 15, can be used for scan initiation. This pattern of scanning continues indefinitely, thereby causing a changing or stepped voltage to be produced across resistor 106, as seen in FIG. 12.

Figure 13:
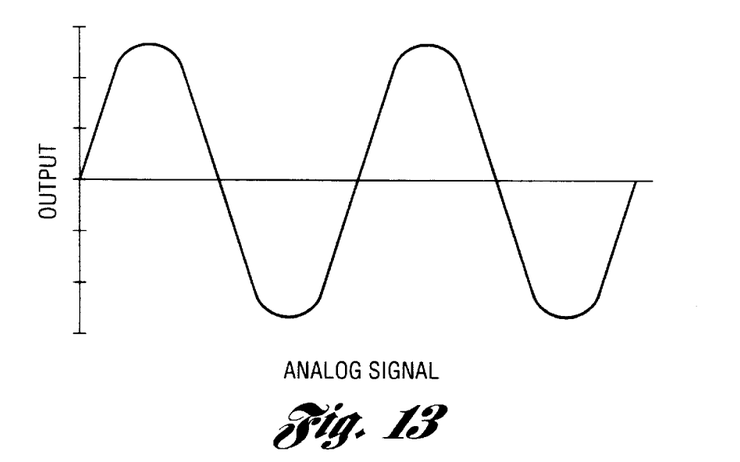
FIG. 13 shows a filtered signal in analog form, which corresponds to the digital scan signal of FIG. 12.
Figure 14:
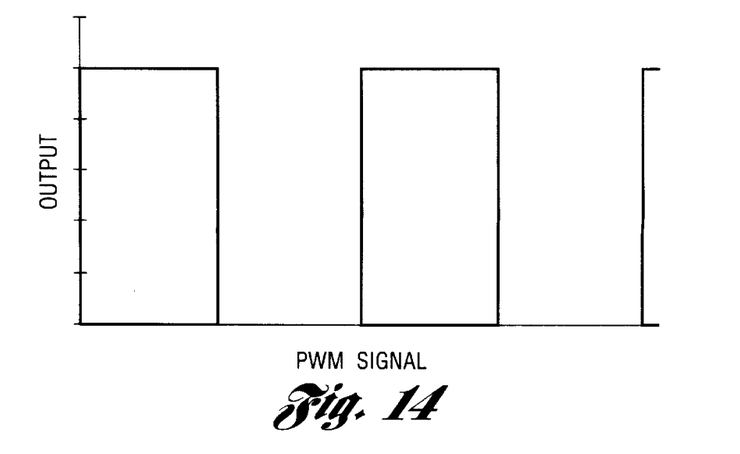
FIG. 14 shows the decoded manual valve position information converted into a pulse-width modulated signal.

As explained previously, the instantaneous voltage across the load resistor 106 will be highest when the selected GMR element is in the strongest magnetic field and will be lowest when the selected element is outside of the main magnetic influence. Analog filtering is used to optimize the voltage signal, whereby the peak voltage is in proper alignment with the scan period. This is seen in FIG. 13. One scan period will be equated to the physical length of the element array sampling range. The time from each scan initiation to peak voltage indicates a distance from the first sample element to the strongest magnetic field location.

The analog signal processor seen at 110 in FIG. 15 outputs a digital zero-crossing signal at 112, the leading edge of which corresponds to the point of peak voltage on the analog signal.

Initiation of the scan of the peak voltage digital signals, as explained previously, are processed in a decode logic portion 114 of the processor. This produces a pulse-width modulated output signal at 116 with a duty cycle proportional to displacement of the manual valve. Depending on the output format desired, the PWM signal can be used directly or it can be converted to an analog signal at 118 using a low-pass filter 120.

In FIG. 15, the scanning logic portion 122 of the processor connects the output of the sensing element array to the load resistor 106. This resistor generates a voltage based on the resistance of the selected GMR element. The scanning logic then shifts one position to connect the next element to resistor 106. One sequence for all of the elements in the array is referred to as a single scan.

The positive leading edge at output Q1 of the shift register 108 begins the scanning operation. This pattern of scanning continues indefinitely to cause a changing voltage to be generated at resistor 106. The voltage across the resistor is a maximum when the magnets are positioned with maximum field intensity in the region of the sampled GMR element. Minimal analog filtering optimizes the voltage signal and places the peak voltage in proper alignment with the scan period. This is done at band pass filter 124 and phase shift circuit 126. The analog signal processing circuit 110 outputs a digital zero-crossing signal at 112, the leading edge of which corresponds to the point of peak voltage.

The scan initiation and peak voltage digital signals are processed by the decode logic circuit 114. This produces a PWM output signal with a duty cycle proportional to displacement of the valve.

For a complete description of alternative circuitry corresponding to the circuit illustrated in FIG. 15, reference may be made to U.S. Pat. No. 5,929,631, which is assigned to the assignee of this invention. The '631 patent is incorporated in this disclosure by reference.

Although a preferred embodiment of the invention has been disclosed, it would be apparent to persons skilled in the art that modifications may be made within the scope of the invention. All such modifications and equivalents thereof are covered by the following claims.

What is claimed is:

1. A position sensor for measuring linear displacement of a shiftable control member in a control body, a sensor housing secured to the control body;
   a magnet carrier slidably positioned in the sensor housing, a pair of magnets on the magnet carrier with juxtaposed poles that are spaced, one with respect to the other to define a pole gap;
   a sensor circuit board secured to the sensor housing adjacent the magnet carrier;
   an array of giant-magneto-resistive (GMR) elements and electronic circuitry on the circuit board, the GMR elements being positioned in the pole gap within a magnetic flux field between the poles;
   the array of GMR elements being oriented in a direction transverse to the direction of shifting movement of the control member;
   means for translating shifting linear movement of the control member to shifting movement of the magnet carrier in a direction transverse to the direction of movement of the control member whereby displacement of the magnetic field relative to the array of GMR elements occurs to provide a variable magnetic flux field strength for the GMR elements; and
   a resistance circuit including a voltage source for the array of GMR elements, the voltage drop in the resistance circuit being directly related to the position of the control member whereby the position of the control member is determined.

2. The position sensor set forth in claim 1 wherein the means for translating shifting linear movement of the control member comprises a guide track in the magnet carrier extending in a direction angularly displaced with respect to the direction of shifting movement of the control member;
   a slider post having one end disposed in the guide track and another end drivably connected to the control member whereby the magnet carrier is shifted transversely with respect to the direction of shifting movement of the control member.

3. The position sensor set forth in claim 2 wherein the array of GMR elements are scanned by the magnets as the magnet carrier is shifted upon movement of the control member;
   a first voltage source;
   a shift register connected to the first voltage source and to the array of GMR elements;
   a second voltage source connected to the array of GMR elements;
   a load resistor;
   a switch array connecting the array of GMR elements to the load resistor;
   a logic means for scanning the voltage input of the array of GMR elements;
   an analog signal processor means for developing scan-generated position data; and
   signal logic decoding means for converting the scan-generated data to provide a measure of the position of the magnets relative to the array of GMR elements.

4. The position sensor set forth in claim 2 wherein the slider post extends through a slot in the sensor housing to drive the magnet carrier;
   openings through the housing located at the ends of the slider post slot to provide a means for expelling ferrous particulate from the sensor assembly;
   the slider post being shaped to wipe ferrous particulate from the magnet carrier through the housing openings at the ends of the housing slider post slot.

5. A position sensor for measuring linear displacement of a shiftable manual valve in an automatic transmission for an automotive vehicle, the manual valve being a component of a control valve system in a transmission housing for the transmission whereby ranges of transmission gear ratios can be selected;
   a position sensor housing secured to the transmission housing, a magnet carrier slidably positioned in the sensor housing;
   a pair of magnets in the magnet carrier with juxtaposed poles;
   a sensor circuit board secured to the sensor housing adjacent the magnet carrier;
   an array of GMR elements and electronic circuitry on the circuit board, the GMR elements being positioned adjacent the magnet poles in a magnetic flux field between the poles;
   the array of GMR elements being oriented in a direction transverse to the direction of shifting movement of the manual valve;
   means for translating shifting linear movement of the manual valve to shifting movement of the array of the magnet carrier in a direction transverse to the direction of movement of the manual valve whereby displacement of the magnets relative to the array of GMR elements occurs to provide a variable magnetic flux field strength with respect to the elements; and
   a resistance circuit including a voltage source for the array of GMR elements, a voltage drop in the resistance circuit being directly related to the position of the manual valve whereby the position of the manual valve is determined.

6. The position sensor set forth in claim 5 wherein the translating means comprises a guide track in the magnet carrier extending in a direction angularly displaced with respect to the direction of shifting movement of the manual valve;
   a slot extending through the position sensor housing and disposed in a direction parallel to the direction of movement of the manual valve;
   a slider post extending through the slot and having one end disposed in the guide track, another end of the slider post being drivably connected to the manual valve whereby the magnet carrier is shifted transversely with respect to the direction of shifting movement of the manual valve.

7. The position sensor set forth in claim 6 wherein the array of GMR elements are scanned by the magnets as the magnet carrier is shifted upon movement of the control valve;
- a first voltage source;
- a shift register connected to the first voltage source and to the array of GMR elements;
- a second voltage source connected to the array of magneto-resistive elements;
- a load resistor;
- a switch array connecting the array of magneto-resistive elements to the load resistor;
- a logic means for scanning the voltage input of the array of magneto-resistive elements;
- an analog signal processor means for developing scan-generated position data; and
- signal logic decoding means for converting the scan-generated data to provide a measure of the position of the magnets relative to the array of GMR elements.

8. The position sensor set forth in claim 6 wherein the slider post extends through a slot in the sensor housing to drive the magnet carrier;
- openings through the housing located at the ends of the slider post slot to provide a means for expelling ferrous particulate from the sensor assembly;
- the slider post being shaped to wipe ferrous particulate from the magnet carrier through the housing openings at the ends of the housing slider post slot.

* * * * *